(12) United States Patent
Phung et al.

(10) Patent No.: US 7,275,129 B1
(45) Date of Patent: Sep. 25, 2007

(54) ACCESSING MULTIPLE COPIES OF RAM DISTRIBUTED THROUGHOUT AN ASIC/FPGA AND MAINTAINING THEIR CONTENT CONSISTENCY

(75) Inventors: Quang Cao Phung, San Jose, CA (US); John Sandoval, Santa Clara, CA (US); Kent Wayne Wendorf, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 10/768,925

(22) Filed: Jan. 30, 2004

(51) Int. Cl.
*G06F 12/00* (2006.01)
(52) U.S. Cl. ............... 711/105; 711/154; 711/147; 711/148; 711/149
(58) Field of Classification Search ............ 711/5, 711/154, 147, 148, 149, 150, 167
See application file for complete search history.

(56) References Cited

U.S. PATENT DOCUMENTS 4,099,253 A * 7/1978 Dooley, Jr. ............... 711/1

2002/0194424 A1* 12/2002 Hasegawa et al. ......... 711/104

OTHER PUBLICATIONS

Hill et al., Digital Systems, 1987, John Wiley and Sons, pp. 328-329.*
"NCR Dual SIOP SCSI Host," 3 pages, downloaded from the internet: <http://www.walshcomptech.com/ohlandl/SCSI/NCR_Dual_SIOP.html>.
"NCR Dual SIOP SCSI Host," 3 pages, downloaded from the internet: <http://www.walshcomptech.com/ohlandl/SCSI/NCR_Dual_SIOP.html>, no date.

* cited by examiner

Primary Examiner—Kimberly McLean-Mayo
(74) Attorney, Agent, or Firm—Charles E. Krueger

(57) ABSTRACT

A system and method for writing the same data field to multiple RAM copies during a single write cycle that fans out write data, address data, and control data to multiple RAMs. The multiple copies of data held at the same address in the multiple RAM copies are also read during a single write cycle and the data from each RAM copy is concatenated into a single word that is read during a single read cycle.

13 Claims, 5 Drawing Sheets

Physical

Logical Write

Logical Read

ACCESSING MULTIPLE COPIES OF RAM DISTRIBUTED THROUGHOUT AN ASIC/FPGA AND MAINTAINING THEIR CONTENT CONSISTENCY

BACKGROUND OF THE INVENTION

In an ASIC/FPGA (Application Specific Integrated Circuit/Field Programmable Gate Array) utilized in a networking application, a context RAM may be needed to hold the per-port configuration that is specific to that port only. Usually, there are several functional blocks inside the ASIC/FPGA that want to access the context RAM to inquire the configuration of a particular port.

Ideally, only one context RAM is needed. However, if there is more than one functional block that needs access to the context RAM in the same cycle, there needs to be an arbitration scheme to resolve the conflict in a timely manner which would satisfy the required access time of each functional block. If there are more than two such functional blocks, then the design of an arbitration logic is much more complex. To simplify the design, an ideal solution is to duplicate the context RAM such that each functional block accesses its own identical copy of the context RAM.

However, other issues come up while maintaining several identical copies of a context RAM:
1. Each copy of the RAM must be separately updated so that the same information will be instant to all functional blocks that access the RAM.
2. The status of each copy of the RAM must be inquired in a time efficient manner.
3. Each copy of the RAM must be tested with minimum time and least cost, etc.
4. Each copy of the RAM will require a distinct set of addresses; the more copies that are used, the greater the address range needed.

Accordingly, an improved technique for providing context information to multiple functional units is required.

BRIEF SUMMARY OF THE INVENTION

In one embodiment of the invention, read and write access is allowed to a set of multiple copies of a RAM as if it were just a single RAM by using an address range that covers a single RAM in the set.

In another embodiment of the invention, the write access occurs during normal operation when the CPU needs to update a particular location or the entire RAM and the read access occurs during a RAM test when the CPU needs to verify the entire RAM's content while keeping the verification time as short as possible.

In another embodiment of the invention, a controller fans out write data and address data, output by the CPU, during a single write cycle, to each of the multiple RAM copies which store the data in the same addressed storage location.

In another embodiment of the invention, all the multiple RAM copies read out data from the same addressed storage location and the data is concatenated into a single bus word that is read by the CPU during a single read cycle.

In another embodiment of the invention, the concatenated word is processed by hardware and an error signal is generated if each field of the concatenated word is not identical.

In another embodiment of the invention, in an FPGA application, the CPU data bus is a fixed width, e.g., 16-bits wide, and the Port Map Table RAM is a fixed depth, e.g., 4 K deep, and a fixed width, e.g., 2-bits wide. When the FPGA needs to duplicate multiple copies, e.g. 5 copies, of this Port Map Table and distribute it across various modules inside FPGA only a 4 K address range is needed to access those 5 copies of RAM.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1A:
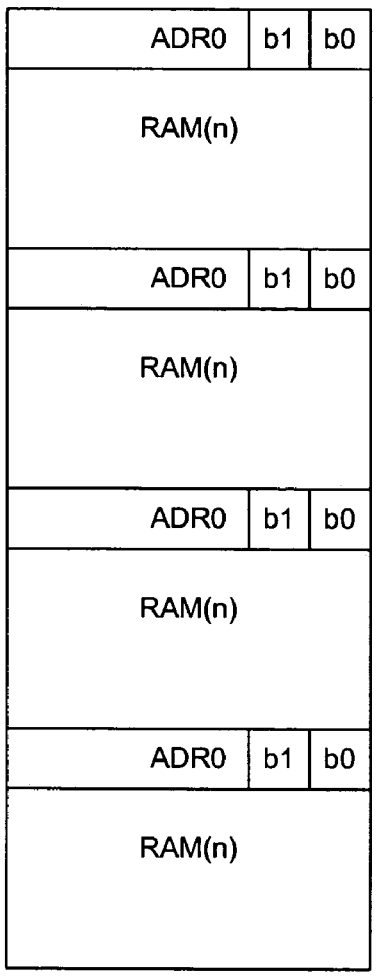
FIGS. 1A-C are block diagrams depicting the physical logical views of memory presented by a preferred embodiment.

An overview of an embodiment of the invention will now be described with reference to FIGS. 1A-C. In this embodiment copies of the same data field, for example a port availability table, are maintained in separate RAM modules that are accessed by an associated functional unit. Thus, there is no need to provide an arbitration unit to control access to the data field as would be the case if it were stored in a single RAM module. The physical view of the RAM modules is depicted in FIG. 1A. In this example, there are four RAM modules, each holding a field two bits wide.

The data is written into the RAMs during an initialization routine executed at start-up, after a RESET, when the port availability table is updated, or for other reasons. The standard technique for writing this data separately to each RAM would require four CPU write cycles which results in the initialization time being longer than desirable.

Figure 1B:

FIG. 1B depicts the logical view for writing the four RAM modules that is presented to the CPU in this embodiment. The four RAM modules are accessed utilizing a single address space. As will be described more fully below, only a single CPU write cycle is required to write to a storage location on each of the four RAM modules.

Figure 1C:
Figure 1C:
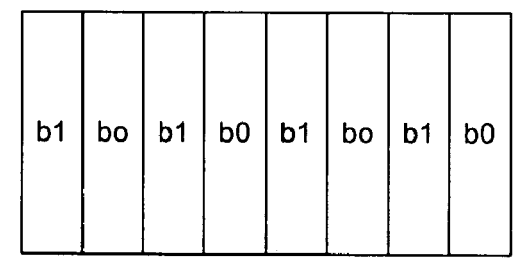
Figure 1C:
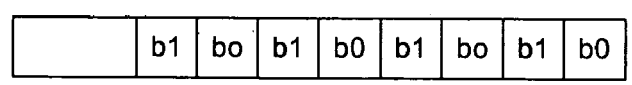

Data is also read from the four RAM modules as depicted in FIG. 1C. The read data is read from the same storage location from each RAM module and the data is concatenated and presented to the CPU in a single bus word. In this example, since the width of the data field is 2 bit positions and the width of the bus word is 16 bit positions up to 8 RAM modules can be read in one bus cycle. The CPU can check the received bus word to determine whether the same data is held in each RAM module.

Figure 2:
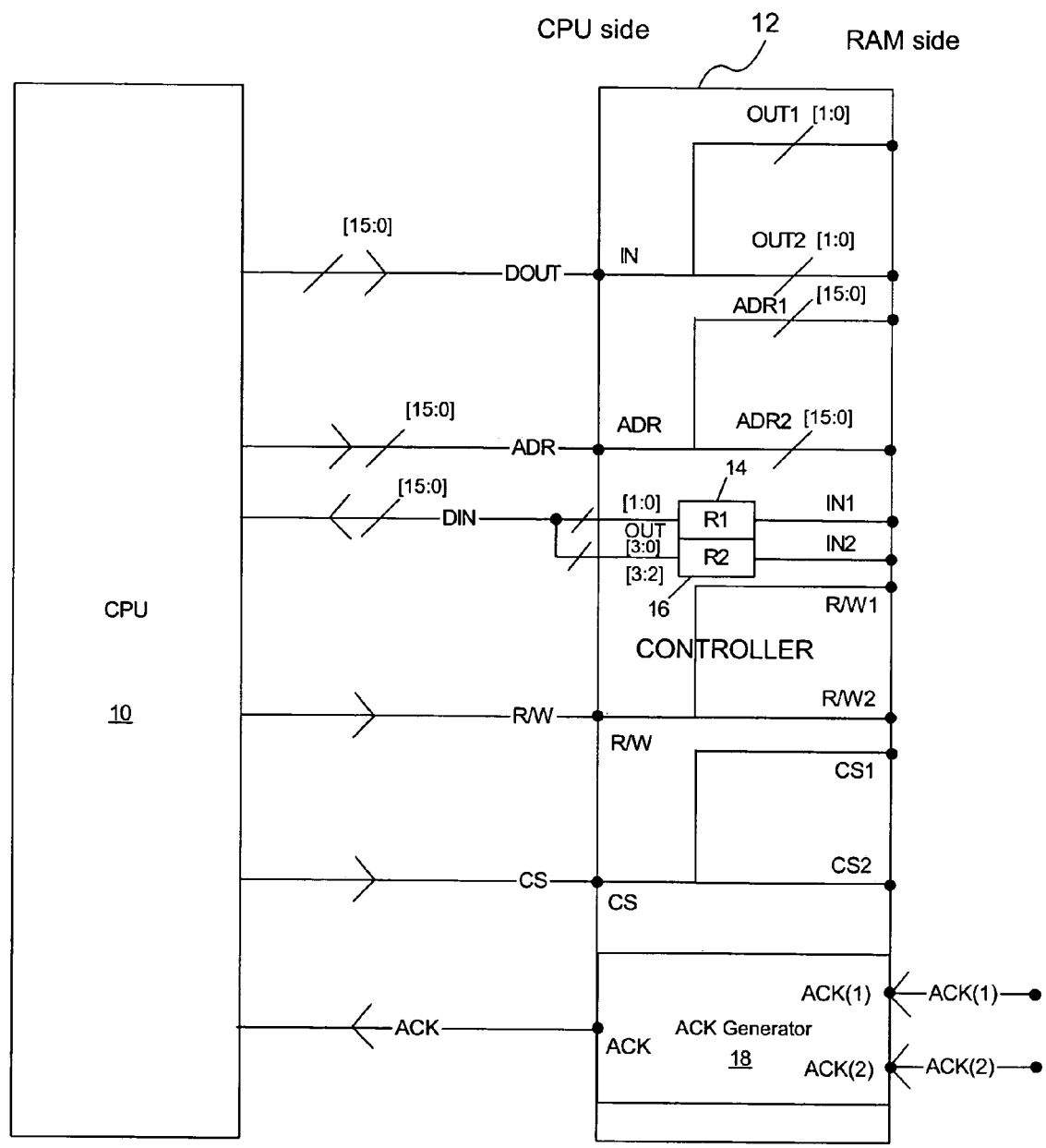
FIG. 2 is a block diagram of the CPU and CONTROLLER utilized in a preferred embodiment of the invention.
Figure 3:
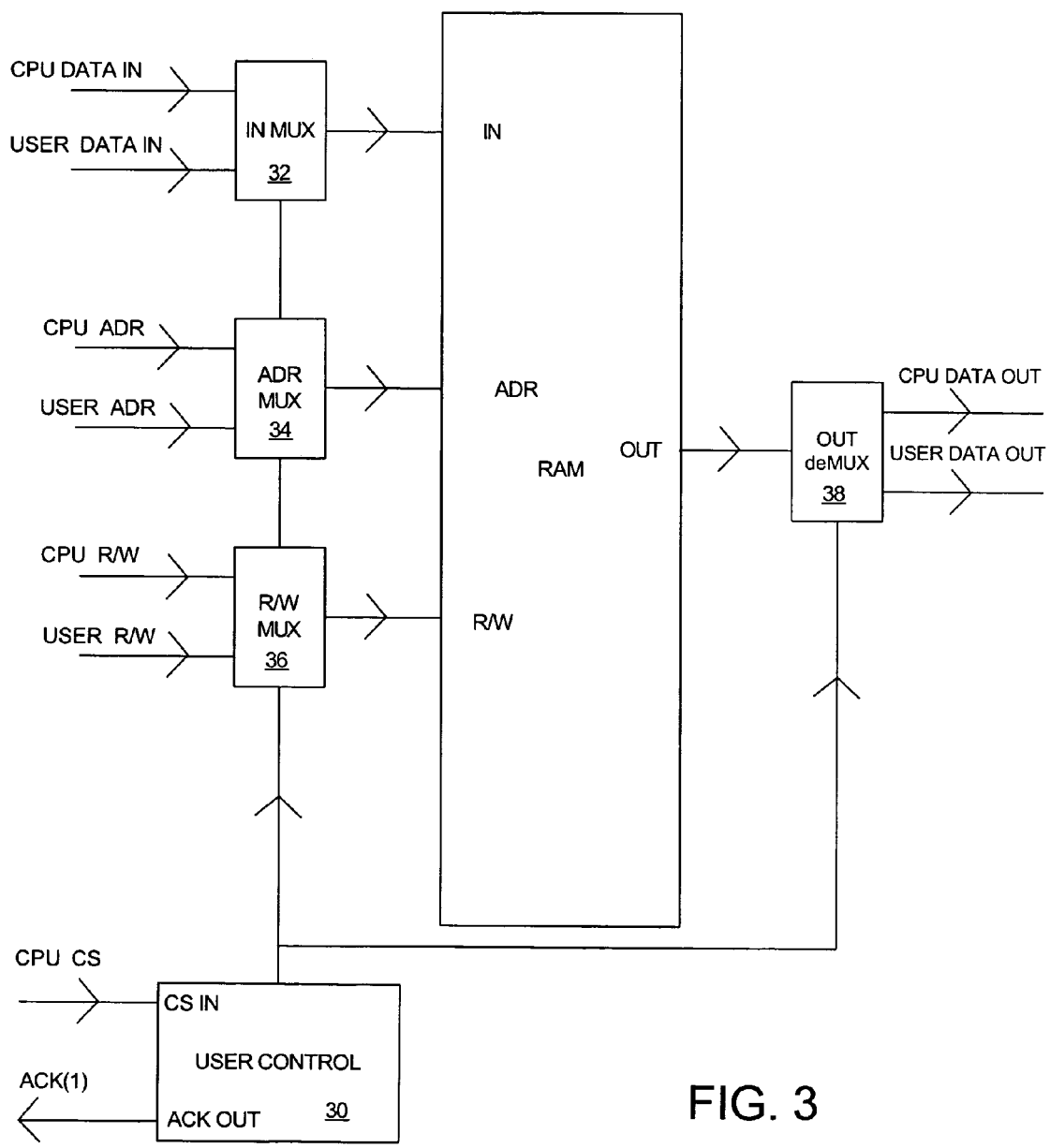
FIG. 3 is a block diagram of the access control circuitry for a RAM copy in a preferred embodiment of the invention.

FIGS. 2 and 3 are block diagrams of an embodiment of the invention. A system maintaining only two copies of a data field in two RAM modules is described to simplify the description. The techniques for extension to more than two copies will be clear to persons of skill in the art from the following description.

In FIG. 2 a CPU 10 has its data-in and data-out ports coupled, respectively, to 16 bit DIN (Data IN) and DOUT (Data OUT) buses, an address port coupled to an ADR bus, a R/W strobe output coupled to a R/W line, a chip select output coupled to a CS line, and an acknowledge port coupled to an ACK line. The DOUT and DIN buses include 16 bit lines [15:0]. Although separate buses are depicted by way of example, not limitation, a single multiplexed bus, or a combination of multiplexed and non-multiplexed may be used in a manner well known in the art.

A CONTROLLER 12 has a CPU side having a CPU-side data-in port (IN) coupled to the DOUT bus, a CPU-side data-out port (OUT) coupled to the DIN bus, a CPU-side address port (ADR) coupled to the ADR bus, a R/W input (R/W) coupled to the R/W line, a CS input (CS) coupled to the CS line, and a CPU ACK output (ACK) coupled to the ACK line. The controller includes first and second registers 14 and 16 having outputs respectively coupled to bit lines [1:0] and [3:2] of the DIN bus at the CPU-side data-out port (OUT). The CPU ACK output is coupled to the output of an ACK signal generator 18.

The controller also has a RAM side having first and second RAM-side data-out ports (OUT1 and OUT2), first and second RAM-side ADR ports (ADR1 and ADR2), first and second RAM-side data-in ports (IN1 and IN2), first and second RAM-side R/W ports (R/W1 and R/W2), first and second RAM-side chip select ports (CS1 and CS2) first and second and first and second ACK input ports (ACK1 and ACK2).

The first and second bit lines [1:0] of the DOUT bus are coupled to each of the first and second RAM-side data-out ports. The first RAM-side data-in port is coupled to the input of the first register and the second RAM-side data-in port is coupled to the input of the second register. The ACK1 and ACK2 input ports are coupled to the inputs of the ACK signal generator 18. The R/W1 and R/W2 ports fan out the R/W strobe and the CS1 and CS2 ports fan out the chip select signal.

FIG. 3 depicts the connections to a first RAM module, with the RAM module having a data-in port (IN), data-out port (OUT), ADR port (ADR), and R/W signal input (R/W). In this embodiment, each RAM is two bits wide and 4 K deep. The RAM data-in port, address port, and R/W input of the RAM module are each coupled to a the output of a respective multiplexer (MUX) which selectively couples the port to receive either a signal from the controller or from an associated functional unit. The data-out port of the RAM is coupled to the input of a demultiplexer (deMUX) that directs the data output by the RAM to either the associated functional unit or the CPU. A USER CONTROL block 30 generates the control signals for the MUXes and deMUX.

In this embodiment, each RAM is part of a functional device and functions as a private RAM for the device. FIG. 3 depicts the USER CONTROL block 30 which schedules tasks for the RAM. For example, the USER CONTROL block 30 must determine that the RAM is not being accessed by the associated functional unit before it can schedule an access by the CPU.

The USER CONTROL block 30 has a CS input for receiving the CPU chip select signal from the CONTROLLER 12, a control output respectively coupled to the control inputs of the INMUX 32, ADRMUX 34, R/W MUX 36, and OUT DEMUX 38. The USER CONTROL block 30 has an ACK output coupled to the first ACK input of the CONTROLLER 12. The CPU DATA IN line couples the first input of the IN MUX 32 to the OUT1 port of the CONTROLLER 12, the CPU ADR line couples the first input of the ADR MUX 34 to the ADR1 port of the CONTROLLER 12, the CPU R/W line couples the first input of the R/W MUX 36 to the R/W port of the CONTROLLER 12, and the CPU DATA OUT line couples the first output of the OUT DEMUX 38 to the IN1 port of the CONTROLLER 12. The input of the OUT DEMUX 38 is coupled to the OUT port of the RAM module. Additionally, the CPU CS line couples the CS IN input of the USER CONTROL block 30 to the CS1 port of the CONTROLLER 12 and the ACK(1) line couples the ACK OUT port of the USER CONTROL block 30 to the ACK1 input port of the CONTROLLER 12.

Figure 4:
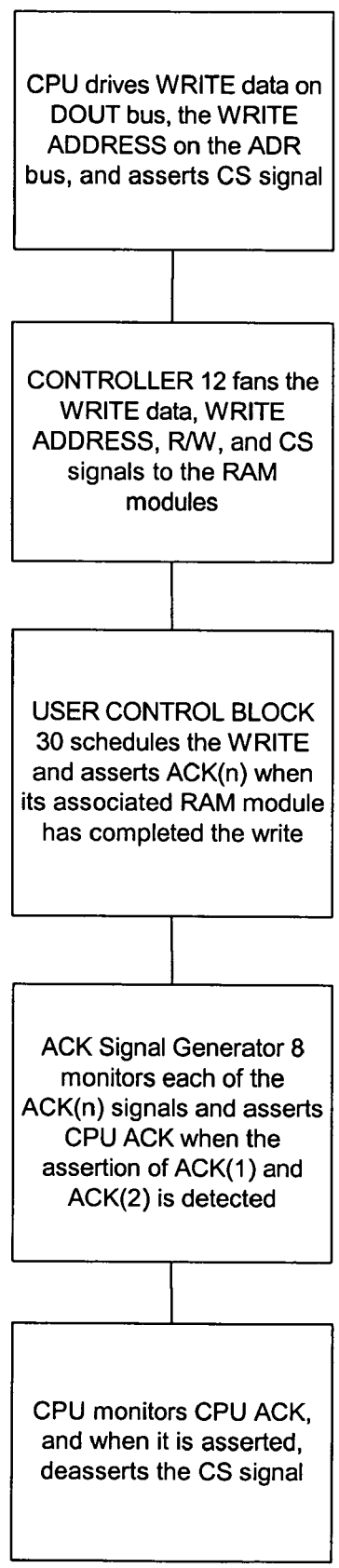
FIG. 4 is a flow chart depicting the steps for writing the set of RAMs in a preferred embodiment of the invention.
Figure 5:
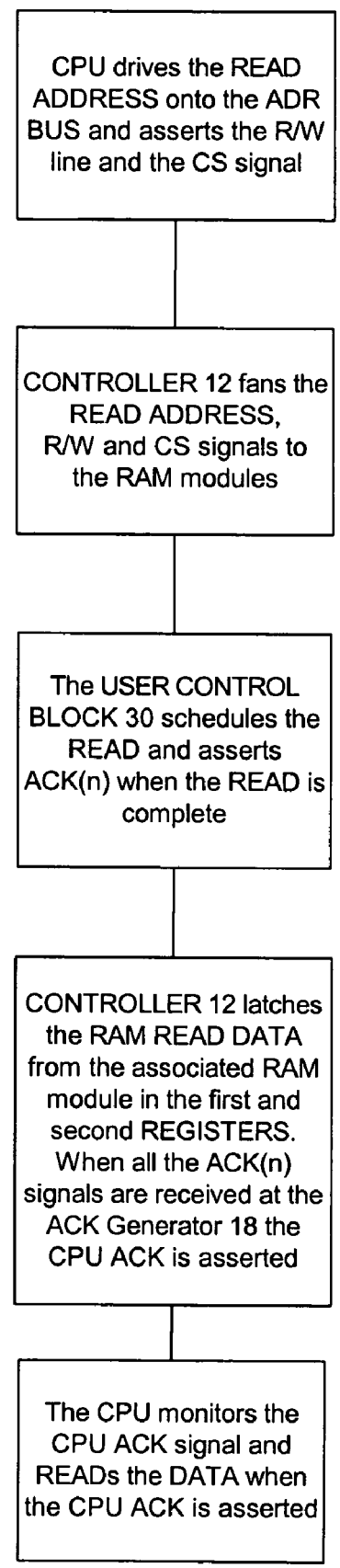
FIG. 5 is a flow chart depicting the steps for reading the set of RAMs in a preferred embodiment of the invention.

The operation of the embodiment depicted in FIGS. 1 and 2 will now be described with reference to the flow charts of FIGS. 4 and 5. As is apparent from FIG. 2, the CONTROLLER 12 fans out the data and control signals output from the CPU to the RAM modules holding multiple copies of the data field and collects the data output by the RAM modules into a single bus word. The USER CONTROL module 30 controls access to the RAM copy in each functional unit.

First a CPU WRITE operation will be described with reference to the flow chart of FIG. 4. In this embodiment a CPU write occurs during start-up or initialization, to update the port tables, or during a reset. The CPU drives the WRITE data onto the DOUT bus, the ADDRESS data onto the ADR bus, deasserts the R/W line and asserts the CS signal to request the WRITE. The CONTROLLER 12 fans the WRITE data, address, R/W and CS signals to the RAM modules so that the same data is ready to be written to the addressed storage location in each RAM module.

The USER CONTROL block 30 in each functional unit schedules the WRITE and asserts an ACK(n) signal when its associated RAM module has completed the WRITE. The ACK signal generator 18 monitors each of the ACK(n) signals and when it detects that ACK(l) and ACK(2) have been asserted it asserts the CPU ACK signal to inform the CPU 10 that the WRITE has completed in all RAMs. After the CPU receives the CPU ACK, it proceeds to deassert the CS signal.

In another embodiment, the USER CONTROL block 30 signals the CONTROLLER 12 with a predicted RAM BUSY(n) signal. When CONTROLLER 12 detects all RAM BUSY(n) signals inactive, the CONTROLLER 12 asserts all CS(n) signals to the USER CONTROL units 30. Thus, the CPU 10 requires only a single write cycle to write the same data to each RAM module because the controller fans out the same data and address to the data input and address input of each RAM module.

The CPU READ operation will now be described with reference to the flow chart of FIG. 5. The CPU drives the ADDRESS onto the ADR bus, asserts the R/W line and the CS signal to request the READ. The CONTROLLER 12 fans the READ address, R/W and CS signals to the RAM modules so that the data is ready to be read from the addressed storage location in each RAM module. The USER CONTROL block 30 schedules the READ and asserts the ACK(n) signal when the READ is complete. The data output by the associated RAM module is latched by the first and second registers 14 and 15 in the CONTROLLER 12. When all the ACK(n) signals are received at the ACK signal generator 18 the CPU ACK is asserted and the latched data is read by the CPU 10 in a single READ cycle.

Thus, the CPU 10 requires only a single READ cycle to access data from each RAM module. The data is concatenated by the registers and read over the data bus in parallel. The sum of the data widths of all the RAMs must be less than the bus width to allow all the data to be concatenated in one bus word.

In another embodiment, built-in hardware in the CONTROLLER 12 checks the latched READ data, does the consistency check instead of the CPU 10, and sets an error status bit when a read occurs with copies that mismatch.

Accordingly, a system for maintaining copies of a data field in multiple RAMs has been described that:

Accesses all copies as one RAM to save address bits and minimize address space.

Maintains consistency across multiple copies.

Minimizes or saves RAM initialization time.

Saves RAM test time.

Is expandable to unlimited numbers of copies.

Can be concatenated to unlimited bus width. If the concatenated bus width is larger than the CPU data bus width, then a multi-word read access scheme is applied to read all the copies of RAM at once.

Can be expanded to access different RAMs with the same depth (same address range) to minimize access time and save address space.

The invention has now been described with reference to the preferred embodiments. Alternatives and substitutions will now be apparent to persons of ordinary skill in the art. For example, the logic states of various signals are described by way of example, not limitation. Further, while the fan out circuitry has been described as being located in a single controller persons of skill in the art will realize that the location and implementation of this circuitry may be physically be distributed in various ways. Accordingly, it is not intended to limit the invention except as provided by the appended claims.

What is claimed is:

1. A system comprising:

write data fan-out circuitry, having a CPU side configured to be coupled to a subset of bus lines of a CPU data bus and having a RAM side configured to be coupled to a plurality of RAM data buses configured to fan out a subset of the data bus lines of a coupled CPU data bus to provide a copy of data carried on the subset of bus lines to each of a plurality of coupled RAM data buses;

address fan-out circuitry, having a CPU side configured to be coupled to a CPU side address bus to receive read and write addresses from the coupled CPU and having a RAM side configured to be coupled to a plurality of RAM address buses configured to fan out a coupled CPU address bus to provide a copy of the address data to each of a plurality of coupled RAM address buses;

control signal fan-out circuitry, having a CPU side configured to be coupled to a CPU read/write control line and having a RAM side configured to be coupled to a plurality of RAM control lines configured to fan out a coupled CPU control signal line to provide a copy of a control signal to each of a plurality of coupled RAM control lines; and concatenating circuitry, having a CPU side configured to be coupled to a plurality of subsets of bus lines of a CPU side data bus and having a RAM side configured to be coupled to a plurality of RAM data buses configured to concatenate data fields read from the same storage location received on different coupled RAM data buses onto subsets of bus lines of a coupled CPU data bus, with data from each of the plurality of RAM data buses transferred to an associated subset of bus lines of a coupled CPU data bus; and acknowledge signal generating circuitry, having a CPU side configured to be coupled to a CPU acknowledge line, having a RAM side configured to be coupled to a plurality of RAM acknowledge lines, and configured to generate a CPU acknowledge signal when RAM acknowledge signals are received on all coupled RAM acknowledge lines.

2. The system of claim 1 where the concatenating circuitry further comprises:

a set of registers, each configured to latch data received from an associated coupled RAM data bus and having an output for driving data on an associated subset of bus lines of a coupled CPU data bus, where each register is configured to latch data received from an associated RAM data bus.

3. The system of claim 1 further comprising:

error signal generating circuitry configured to indicate an error if the data fields received from each coupled RAM bus are not identical.

4. A method comprising:

outputting a WRITE data field and a WRITE address field from a CPU;

fanning out the WRITE data field and address field to each RAM module in a plurality of RAM modules;

fanning out a WRITE control signal to each RAM module in the plurality;

writing the WRITE data field to the same addressed storage location, indicated by the WRITE address field, in each of the plurality of RAM modules during a single CPU WRITE cycle;

asserting a READ control signal indicating the microprocessor is ready to read an n-bit READ data field from a storage location specified by a READ address field output by the CPU;

fanning out a READ address field output by the CPU to each RAM module in the plurality;

outputting a READ data field, from a storage location addressed by the READ address field fanned out from the CPU, from each RAM module in the plurality;

concatenating the READ data fields read from each of the RAM modules to form a concatenated data field Nxn bits wide; and reading the concatenated data field into the CPU during a single CPU READ cycle; and asserting a WRITE control signal to initiate the CPU WRITE cycle;

generating an acknowledge signal indicating that all the RAM modules have completed writing the data field; and deasserting the first WRITE control signal in response to the acknowledge signal.

5. The method of claim 4 further comprising the steps of:

generating an acknowledge signal indicating that the READ data fields output by all the RAM modules are included in the concatenated data field; and in response to the acknowledge signal, reading the concatenated data field during the single CPU READ cycle.

6. The method of claim 4 where the CPU receives READ data on a bus including a plurality of data lines and where the step of concatenating further comprises the steps of:
- latching each READ data field output from each RAM module in the plurality; and
- driving each latched READ data field on a distinct subset of n data lines of said bus.

7. The method of claim 4 where one of said RAMs is included in a functional unit that accesses the RAM to read the data field stored in the RAM and further comprising the steps of:
- sharing access to a RAM module between the CPU and an associated functional unit.

8. The method of claim 4 further comprising the step of:
- indicating an error if the data fields output by each RAM module are not identical.

9. A system comprising:
- means for outputting a WRITE data field and a WRITE address field from a the CPU;
- means for fanning out the WRITE data field and address field to each RAM module in a plurality;
- means for fanning out a WRITE control signal to each RAM module in the plurality;
- means for writing the WRITE data field to the same addressed storage location, indicated by the WRITE address field, in each of the plurality of RAM modules during a single CPU WRITE cycle;
- means for asserting a READ control signal indicating the microprocessor is ready to read an n-bit READ data field from a storage location specified by a READ address field output by the CPU;
- means for fanning out a READ address field output by the CPU to each RAM module in the plurality;
- means for outputting a READ data field, from a storage location addressed by the READ address field fanned out from the CPU, from each RAM module in the plurality;
- means for concatenating the READ data fields read from each of the RAM modules to form a concatenated data field N×n bits wide;
- means for reading the concatenated data field into the CPU during a single CPU READ cycle;
- means for asserting a WRITE control signal to initiate the CPU WRITE cycle;
- means for generating an acknowledge signal indicating that all the RAM modules have completed writing the data field; and
- means for deasserting the first WRITE control signal in response to the acknowledge signal.

10. The system of claim 9 further comprising:
- means for generating an acknowledge signal indicating that the READ data fields output by all the RAM modules are included in the concatenated data field; and
- means for reading the concatenated data field during the single CPU READ cycle in response to the acknowledge signal.

11. The system of claim 9 where the CPU receives READ data on a bus including a plurality of data lines and where the means for concatenating further comprises:
- means for latching each READ data field output from each RAM module in the plurality; and
- means for driving each latched READ data field on a distinct subset of n data lines of said bus.

12. The system of claim 9 where one of said RAMs is included in a functional unit that accesses the RAM to read the data field stored in the RAM and further comprising:
- means for sharing access to a RAM module between the CPU and an associated functional unit.

13. The system of claim 9 further comprising:
- means for indicating an error if the data fields output by each RAM module are not identical.

* * * * *